United States Patent
Han et al.

(10) Patent No.: US 8,915,021 B2
(45) Date of Patent: Dec. 23, 2014

(54) INTEGRATED REGULATOR DEVICE OF GLASS AND CURTAIN FOR DOOR

(71) Applicant: Hyundai Motor Company, Seoul (KR)

(72) Inventors: Jung Ho Han, Seoul (KR); Hoo Sang Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 13/900,156

(22) Filed: May 22, 2013

(65) Prior Publication Data

US 2014/0231033 A1 Aug. 21, 2014

(30) Foreign Application Priority Data

Feb. 15, 2013 (KR) ........................ 10-2013-0016203

(51) Int. Cl.
*B60J 5/04* (2006.01)
*E06B 9/50* (2006.01)
(52) U.S. Cl.
CPC ........................................ *E06B 9/50* (2013.01)
USPC ....................... 49/502; 49/63; 49/142; 49/349
(58) Field of Classification Search
USPC ......... 49/502, 61–63, 65, 142, 348, 349, 352; 74/352–354; 296/146.2, 97.9, 97.11
See application file for complete search history.

(56) References Cited

U.S. PATENT DOCUMENTS

| | | | |
|---|---|---|---|
| 2,780,458 A * | 2/1957 | Thaxton | 49/63 |
| 4,773,697 A * | 9/1988 | Svensson | 296/152 |
| 5,165,188 A * | 11/1992 | Tsiros | 49/63 |
| 5,570,542 A * | 11/1996 | Cameron | 49/463 |
| 5,920,159 A * | 7/1999 | Miller et al. | 318/4 |
| 6,367,536 B1* | 4/2002 | St Louis | 160/90 |
| 6,430,873 B1* | 8/2002 | Borchuk et al. | 49/352 |
| 6,523,880 B1* | 2/2003 | Yako | 296/97.1 |
| 8,439,433 B2* | 5/2013 | Kim et al. | 296/214 |
| 2005/0183339 A1* | 8/2005 | Schaaf, Jr. | 49/54 |
| 2008/0034667 A1* | 2/2008 | Fischer | 49/502 |
| 2008/0034668 A1* | 2/2008 | Fischer | 49/502 |
| 2014/0158309 A1* | 6/2014 | Park et al. | 160/99 |

FOREIGN PATENT DOCUMENTS

| | | |
|---|---|---|
| JP | 2009-243108 A | 10/2009 |
| KR | 10-0529182 B1 | 11/2005 |
| KR | 10-0816000 B1 | 3/2008 |

* cited by examiner

*Primary Examiner* — Katherine Mitchell
*Assistant Examiner* — Scott Denion
(74) *Attorney, Agent, or Firm* — McDermott Will & Emery LLP

(57) ABSTRACT

Disclosed herein is an integrated regulator device of a glass and a curtain for a door, including: a motor provided in a door panel; a drive gear inserted into the motor in a vertical direction, rotatably provided, and having a shaft shape; a glass drum operated together with a glass provided in the door and inserted into the drive gear to move in the vertical direction according to rotation of the drive gear; and a curtain drum operated together with an electric curtain provided in the door, inserted into the drive gear, positioned beneath the glass drum, and moving in the vertical direction according to the rotation of the drive gear.

5 Claims, 11 Drawing Sheets

INTEGRATED REGULATOR DEVICE OF GLASS AND CURTAIN FOR DOOR

CROSS-REFERENCE TO RELATED APPLICATION

This application is based on and claims priority from Korean Patent Application No. 10-2013-0016203, filed on Feb. 15, 2013 in the Korean Intellectual Property Office, the disclosure of which is incorporated herein in its entirety by reference.

BACKGROUND

1. Field

The present disclosure relates to an integrated regulator device of a glass and a curtain for a door, and more particularly, to an integrated regulator device of a glass and a curtain for a door capable of independently operating a glass and an electric curtain included in a door.

2. Background

Generally, in a regulator for a door glass, a carrier plate is coupled to a regulator channel so as to ascend or descend while being slid. A cable is connected to the carrier plate to thereby be wound around a drum connected to a shaft of a regulator motor via upper and lower holders installed at upper and lower portions of the regulator channel. A window glass is installed as a glass grip at the carrier plate, and the regulator motor is forwardly rotated or reversely rotated by operating a switch, such that the carrier plate ascends or descends in the regulator channel. As a result, the door glass may ascend or descend and be opened and closed.

The door glass is transparent. Therefore, in the case of some large automobiles, an electric door curtain has been installed at a door, particularly, a rear door in order to block light and protect privacy. The door curtain has a configuration in which a roll is installed in a cavity formed, for example, between a door inner panel and a door trim so as to support both ends of a bracket fixed to the door inner panel. One end of a curtain body is fixed to and wound around the roll. A coil spring supported by the roll and the bracket is wound around one side of the roll. The curtain body is drawn to a hole formed at an upper end of the door trim. A hanger is attached to the upper end, and a hook on which the hanger is hung is installed at the door frame trim.

However, since the door regulator and the door curtain are separately configured such that the door glass and the door curtain are also separately operated, their use lacks convenience. In addition, since driving parts for driving the glass and the curtain should be separately provided, cost is increased.

SUMMARY

Accordingly, the present disclosure has been made to solve the above-mentioned problems while advantages achieved are maintained intact.

One advantage to be achieved by the present disclosure is to provide an integrated regulator device of a glass and a curtain for a door capable of independently operating a glass and an electric curtain included in a door through an integrated regulator.

In one aspect of the present disclosure, there is provided an integrated regulator device of a glass and a curtain for a door, including: a motor provided in a door panel; a drive gear inserted into the motor along a linear axis, rotatably provided, and having a shaft shape; a glass drum operated together with a glass provided in the door and inserted into the drive gear to move along the linear axis according to rotation of the drive gear; and a curtain drum operated together with an electric curtain provided in the door, inserted into the drive gear, positioned beneath the glass drum, and moving along the linear axis according to the rotation of the drive gear.

The integrated regulator device of a glass and a curtain for a door may further include a drum retainer disposed over the motor, into which the drive gear including the glass drum and the curtain drum is inserted, and a glass stopper and a curtain stopper protruding from a lower surface of an inner side of an upper portion thereof and on an upper surface of an inner side of a lower portion thereof, respectively, to limit rotation of the glass drum and the curtain drum.

The center of the drive gear may be provided with an insertion protrusion, and the centers of the glass drum and the curtain drum may be provided with insertion grooves corresponding to the insertion protrusion.

A lower portion of the glass drum may be provided with ball bearings and an upper portion of the curtain drum may be provided with bearing holes corresponding to the ball bearings.

An outer peripheral surface of the drive gear and inner peripheral surfaces of the glass drum and the curtain drum inserted into the drive gear may be provided with screw threads corresponding to each other.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Exemplary embodiments of the present disclosure will be described in detail with reference to the accompanying drawings.

An integrated regulator device of a glass and a curtain for a door according to an exemplary embodiment of the present disclosure is configured to include a motor 100 provided in a door panel, a drive gear 110 operated together with the motor 100, and a glass drum 210 and a curtain drum 220 inserted into the drive gear 110, as shown in FIGS. 1 to 9B.

Figure 1:
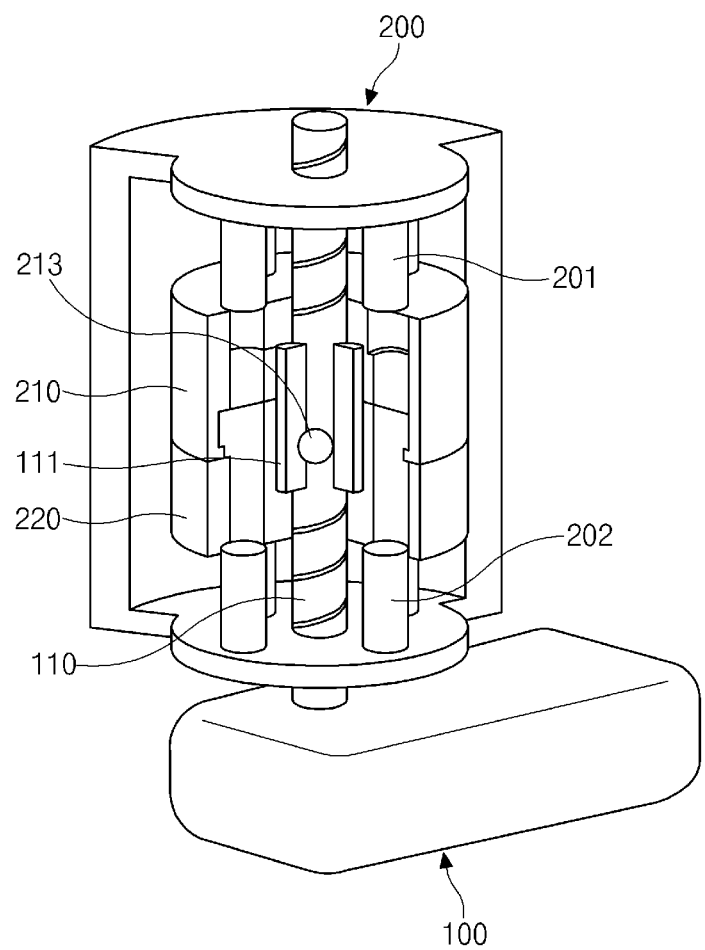
FIG. 1 is a perspective view showing an integrated regulator device of a glass and a curtain for a door according to an exemplary embodiment of the present disclosure.

As shown in FIG. 1, the motor 100 is mounted in the door panel and is rotatable.

Here, the motor 100 is connected to a power supply unit (not shown) provided in a vehicle and receives power from the power supply unit to thereby be rotatable.

Figure 2:
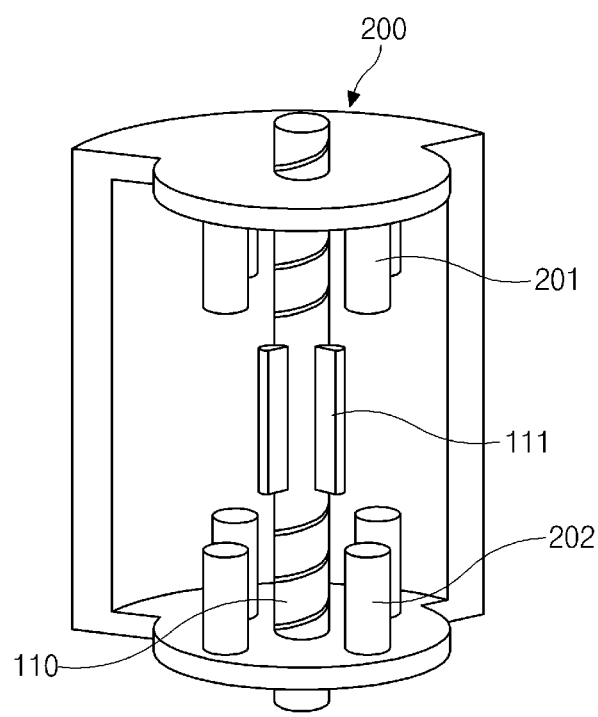
FIG. 2 is a perspective view showing a drive gear and a drum retainer of the integrated regulator device of a glass and a curtain for a door according to an exemplary embodiment of the present disclosure.

As shown in FIGS. 1 and 2, the drive gear 110 receives a rotational operation generated in the motor 100 to allow a glass drum 210 and a curtain drum 220 along a linear axis formed by the drive gear 110.

The drive gear 110 has a shaft shape and is inserted into the motor 100 along the linear axis to thereby be rotated in a clockwise direction or a counterclockwise direction at the time of operating the motor 100.

As shown in FIGS. 1 to 4B, the glass drum 210 is operated together with a glass 211 provided in the door and opened or closed while moving along the linear axis. The glass drum 210, has a through-hole H formed at the center thereof, and is inserted into the drive gear 110.

As described above, the glass drum 210 inserted into the drive gear 110 moves in the vertical direction while being rotated at the time of the rotation of the drive gear 110 by the motor 100.

Here, it is preferable that an outer peripheral surface of the drive gear 110 and an inner peripheral surface of the through-hole H of the glass drum 210 inserted into the drive gear 110 are provided with screw threads (not shown) having shapes corresponding to each other to allow the glass drum 210 to move along the linear axis using the screw threads at the time of the rotation of the drive gear 110.

The curtain drum 220 is operated together with an electric curtain 221 provided in the door and opened or closed while moving in the vertical direction, has a through-hole H formed at the center thereof, and is inserted into the drive gear 110.

Here, the curtain drum 220 is positioned beneath the glass drum 210.

As described above, the curtain drum 220 inserted into the drive gear 110 moves in the vertical direction while being rotated at the time of the rotation of the drive gear 110 by the motor 100.

In addition, it is preferable that the outer peripheral surface of the drive gear 110 and an inner peripheral surface of the through-hole H of the curtain drum 220 inserted into the drive gear 110 are provided with screw threads having shapes corresponding to each other to allow the curtain drum 220 to move along the linear axis using the screw threads at the time of the rotation of the drive gear 110.

Meanwhile, since a connection structure between the glass drum 210 and the door glass 211 and a connection structure between the curtain drum 220 and the electric curtain 221 have been already well-known, a description thereof will be omitted in the present specification.

In addition, the integrated regulator device of a glass and a curtain for a door according to an exemplary embodiment of the present disclosure further includes a drum retainer 200 which is disposed over the motor 100 and into which the drive gear 110 mounted with the glass drum 210 and the curtain drum 220 are inserted.

The drum retainer 200 may have a cylindrical shape and include a glass stopper 201 protruding from a lower surface of an inner side of an upper portion thereof in order to limit rotation of the glass drum 210 and a curtain stopper 202 protruding from an upper surface of an inner side of a lower portion thereof in order to limit rotation of the curtain drum 220.

The center of the drive gear 110 may be provided with an insertion protrusion protruded in a '+' shape and the through-holes of the glass drum 210 and the curtain drum 220 are provided with insertion grooves 212 and 222 corresponding to the insertion protrusion 111 of the drive gear 110 to allow the glass drum 210 and the curtain drum 220 to be rotated at the time of the rotation of the drive gear 110 by the motor 100.

Figure 3A:
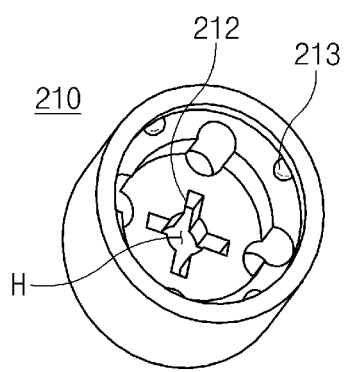
FIG. 3A is a perspective view showing a glass drum of the integrated regulator device of a glass and a curtain for a door according to an exemplary embodiment of the present disclosure.
Figure 3B:
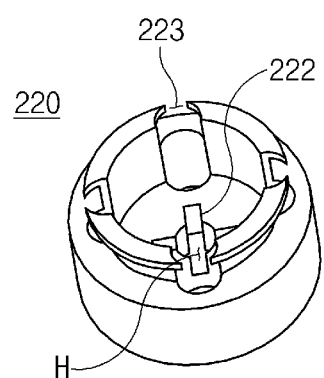
FIG. 3B is a perspective view showing a curtain drum of the integrated regulator device of a glass and a curtain for a door according to an exemplary embodiment of the present disclosure.
Figure 3C:
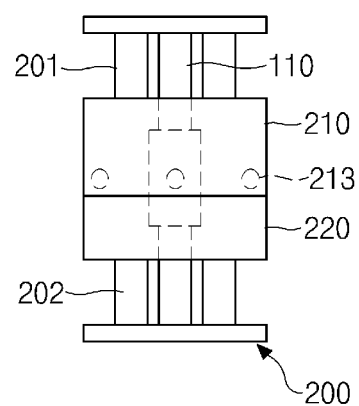
FIG. 3C is a side view showing the glass drum and the curtain drum inserted into the drum retainer in the integrated regulator device of a glass and a curtain for a door according to an exemplary embodiment of the present disclosure.

In addition, as shown in FIGS. 3A and 3B, a lower portion of the glass drum 210 is provided with ball bearings 213 and an upper portion of the curtain drum 220 is provided with bearing holes 223 corresponding to the ball bearings 213 to allow the glass drum 210 and the curtain drum 220 to be integrated with each other and move in the vertical direction at the time of the rotation of the drive gear 110. This configuration may also allow only the curtain drum 220 to be separately rotated in the case in which the rotation of the glass drum 210 is stopped by the glass stopper 201, and allow only the glass drum 210 to be separated rotated in the case in which the rotation of the curtain drum 220 is stopped by the curtain stopper 202.

Hereinafter, an operation of the integrated regulator device of a glass and a curtain for a door according to the exemplary embodiment of the present disclosure will be described.

Figure 4A:
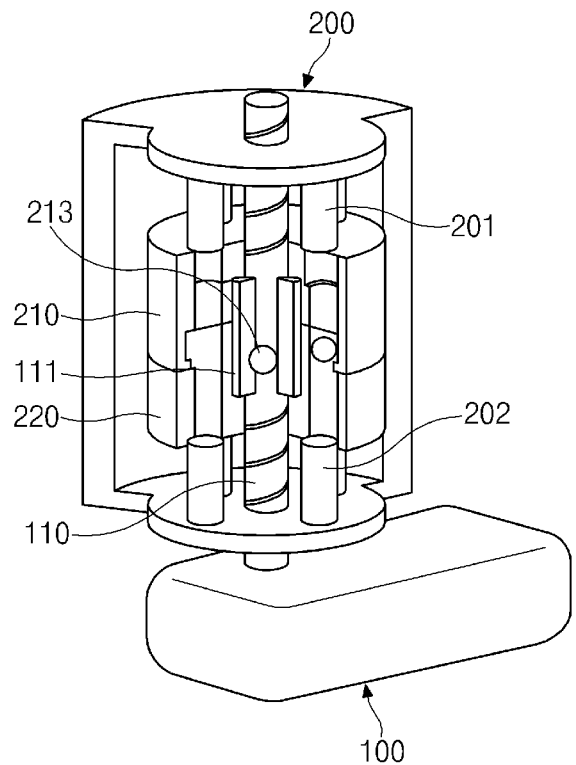
FIGS. 4A-B are a perspective view showing a reference position in the integrated regulator device of a glass and a side view of a curtain for a door according to an exemplary embodiment of the present disclosure.
Figure 4B:
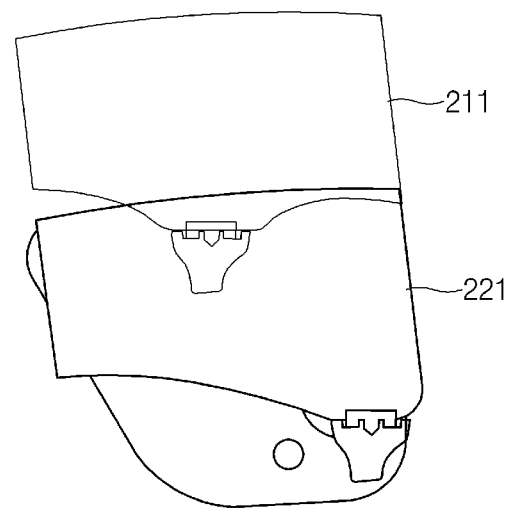

First, according to the exemplary embodiment of the present disclosure, a state in which the glass 211 ascends upwardly and a state in which the curtain 221 descends downwardly becomes a reference position. This state is shown in FIGS. 4A and 4B. In this case, the glass drum 210 and the curtain drum 220 are maintained in a stationary state.

Figure 7A:
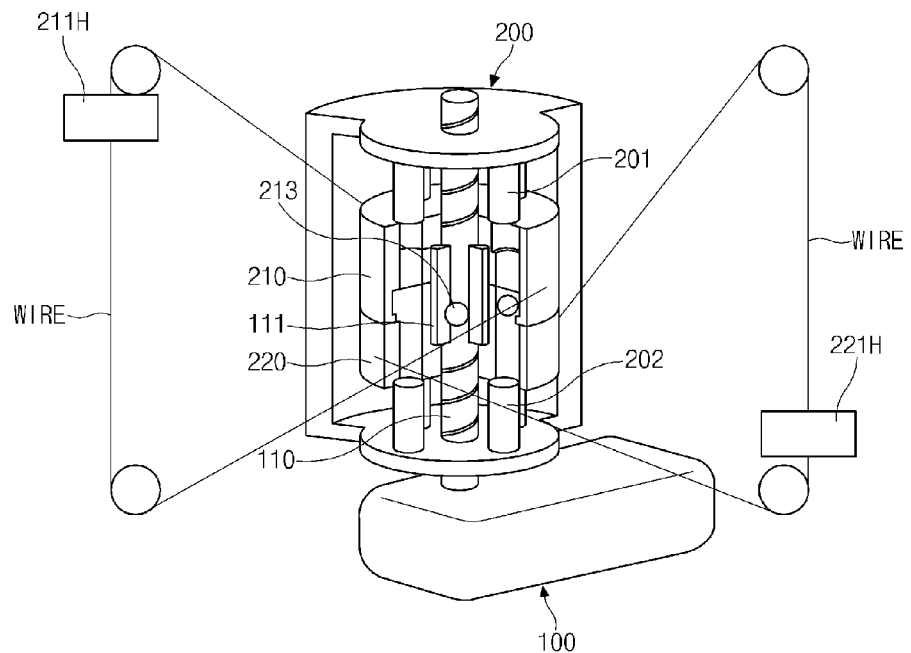
FIGS. 7A-B is a view showing positions of the glass and the curtain in the reference position in the integrated regulator device of a glass and a curtain for a door according to an exemplary embodiment of the present disclosure.
Figure 7B:
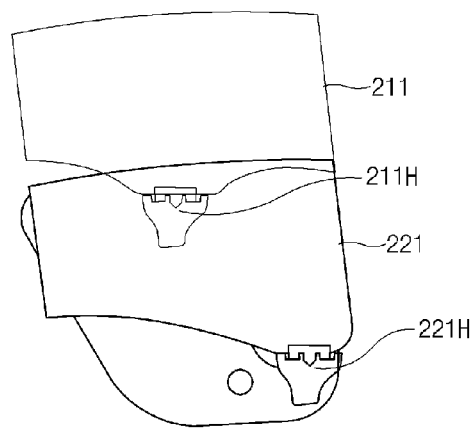

In addition, as shown in FIG. 7A, the glass 211 and the curtain 221 are connected to separate operation wires through a glass holder 211H and a curtain holder 221H, respectively, such that the glass 211 and the curtain 221 ascend or descend according to the rotation of the glass drum 210 and the curtain drum 220.

Figure 5A:
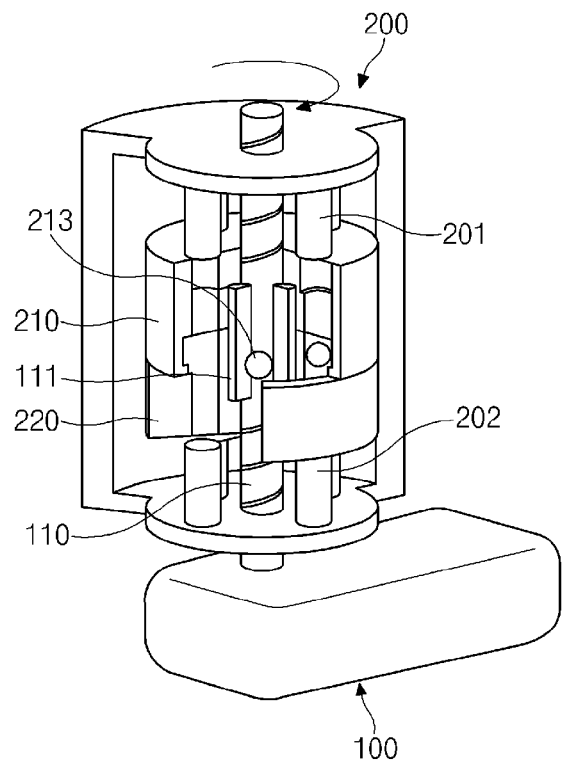
FIGS. 5A-D are perspective views showing an operation state of a curtain in the integrated regulator device of a glass and a curtain for a door according to an exemplary embodiment of the present disclosure.

FIGS. 5A to 5D show an operation of the curtain 221. When a passenger operates the curtain 211 by operating a switch (not shown) mounted in the vehicle, the motor 100 is operated to rotate the drive gear 110, such that the glass drum 210 and the curtain drum 220 engaged with the drive gear 110 are rotated as shown in FIG. 5A.

Figure 5B:
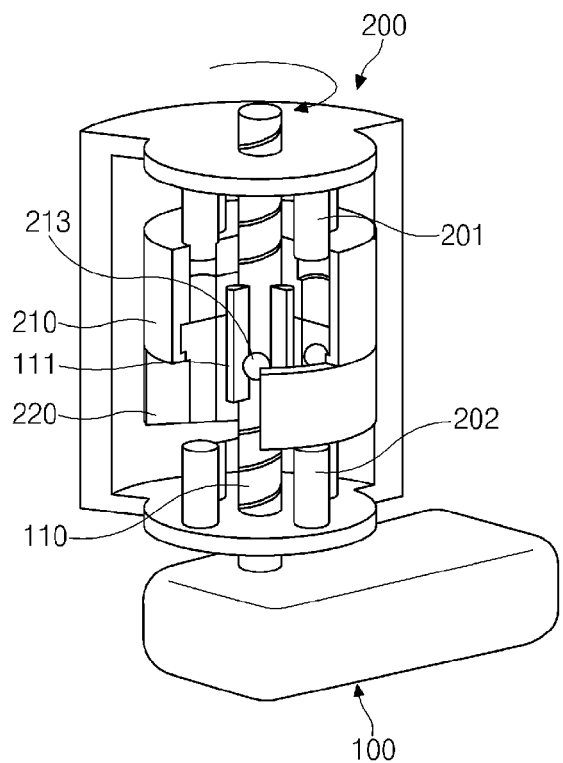
Figure 5C:
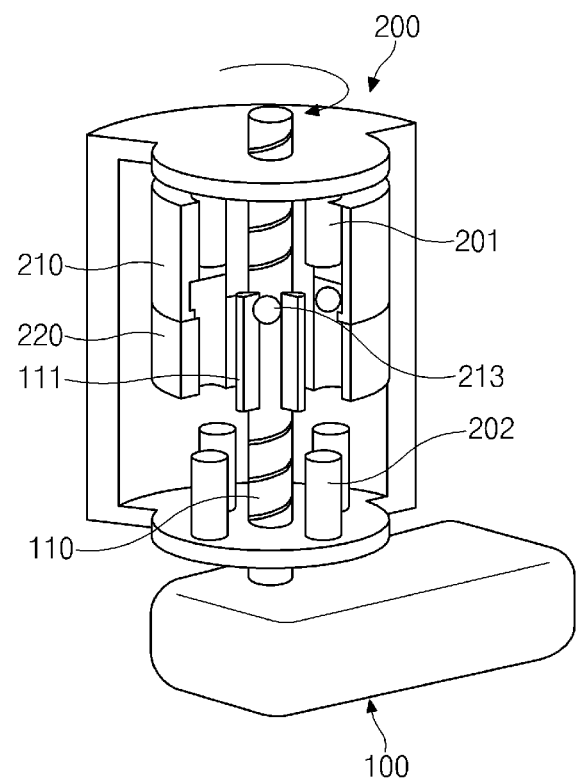
Figure 5D:
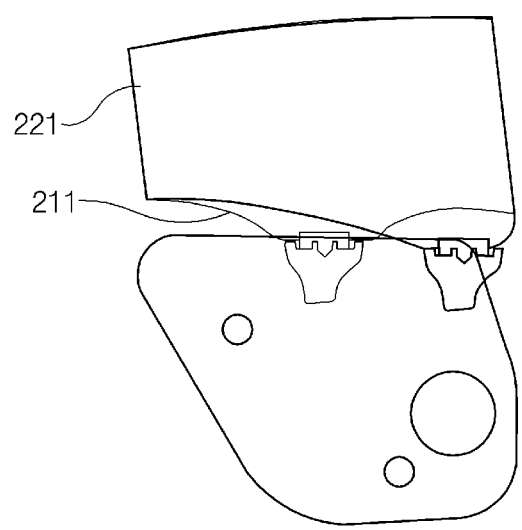
Figure 8A:
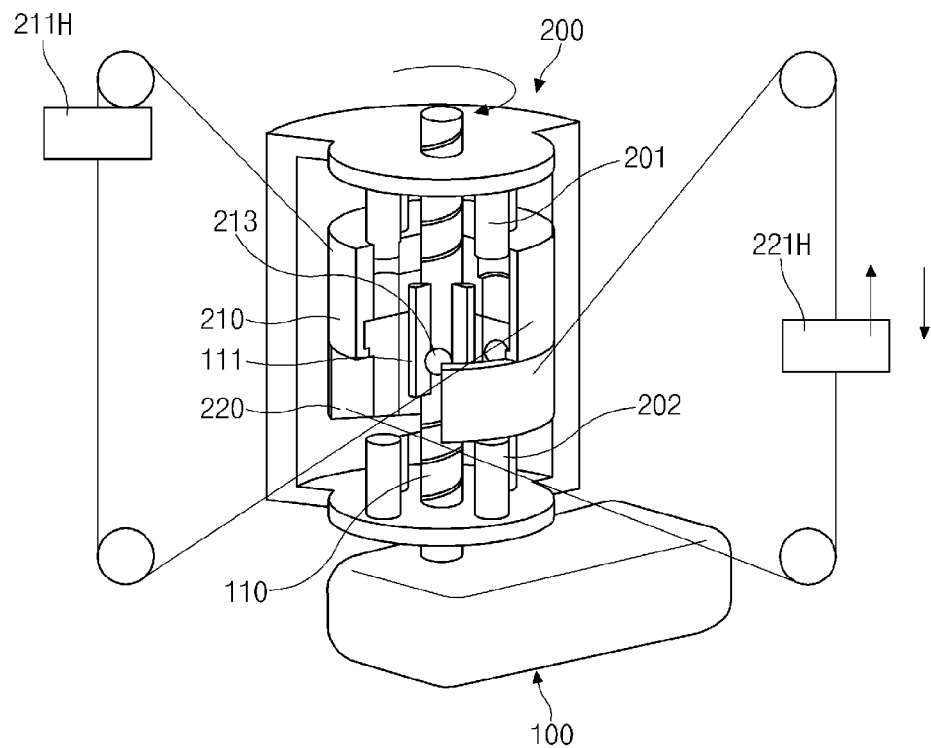
FIGS. 8A-B are perspective views showing positions of the glass and the curtain in the operation state of the curtain in the integrated regulator device of a glass and a curtain for a door according to an exemplary embodiment of the present disclosure.
Figure 8B:
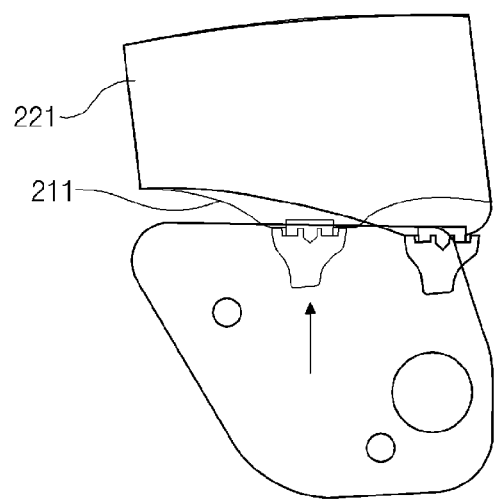

In this case, the curtain drum 220 moves upwardly along the linear axis together with the glass drum 210 by bearing connection while being rotated as shown in FIG. 5B, and the glass drum 210 ascends without being rotated by the glass stopper 201, such that the glass drum 210 and the curtain drum 220 ascend upwardly along the linear axis as shown in FIG. 5C. As a result, an operation of the curtain 221 is completed as shown in FIG. 5D. As shown in FIGS. 8A and 8B, the glass drum 210 is fixed, the glass 211 is fixed, and the curtain drum 220 is rotated, such that the curtain 221 may ascend or descend.

Figure 6A:
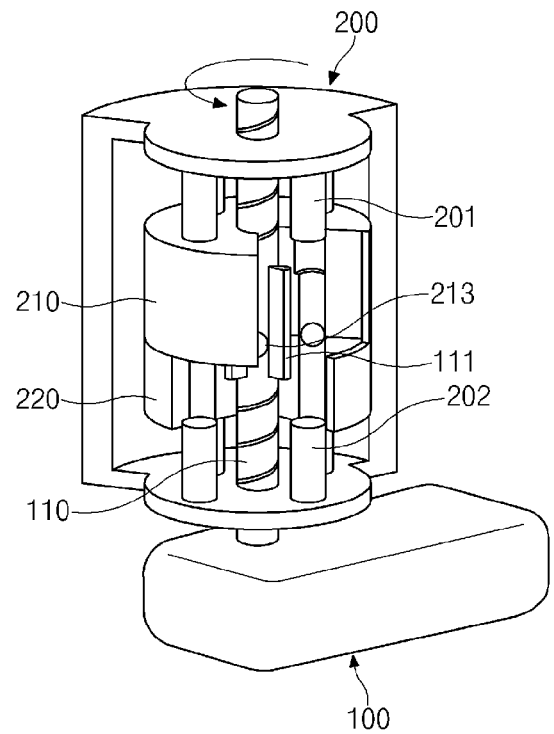
FIGS. 6A-D are perspective views showing an operation state of a glass in the integrated regulator device of a glass and a curtain for a door according to an exemplary embodiment of the present disclosure.

FIGS. 6A to 6D show an operation of the glass 211. When a passenger operates the glass 211 by operating the switch (not shown) mounted in the vehicle, the motor 100 is operated to rotate the drive gear 110 in an direction opposite to a direction in which the curtain 211 is operated, such that the glass drum 210 and the curtain drum 220 engaged with the drive gear 110 are rotated in the reverse direction as shown in FIG. 6A.

Figure 6B:
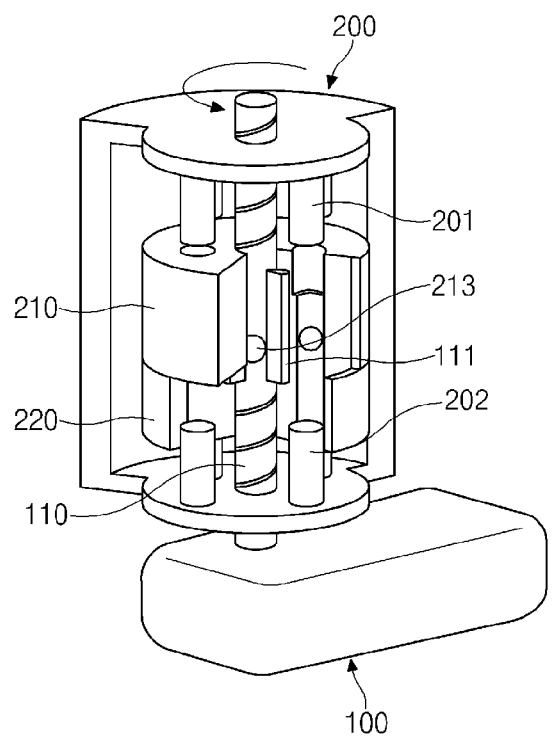
Figure 6C:
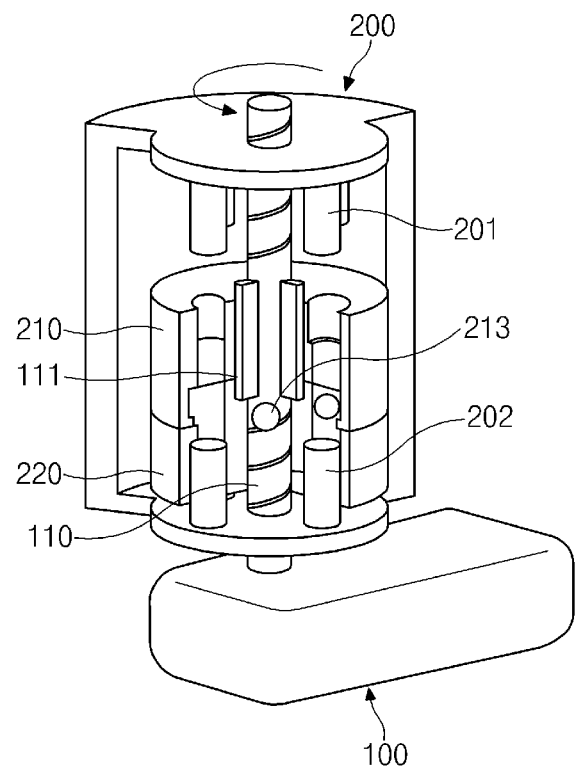
Figure 6D:
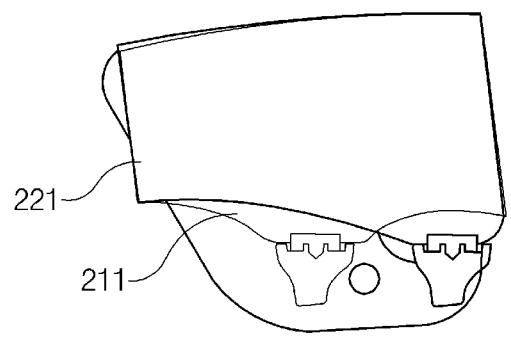
Figure 9A:
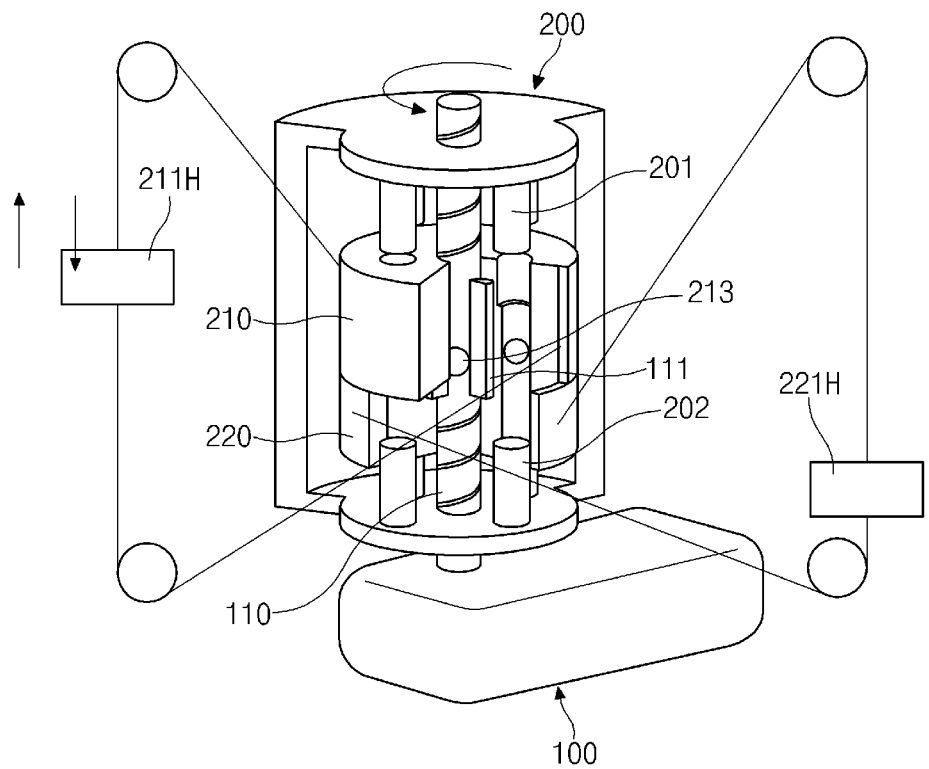
FIGS. 9A-B are perspective views showing positions of the glass and the curtain in the operation state of the glass in the integrated regulator device of a glass and a curtain for a door according to an exemplary embodiment of the present disclosure.
Figure 9B:
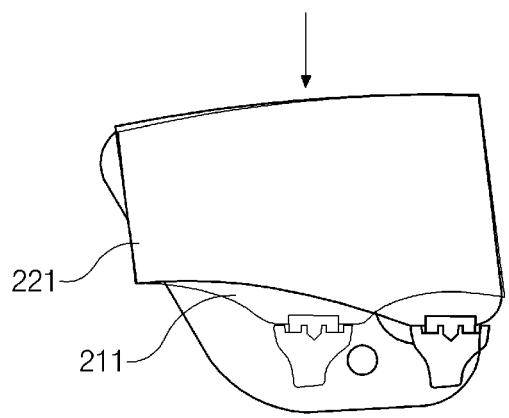

In this case, the curtain drum 220 moves downwardly along the linear axis together with the glass drum 210 by the bearing connection while being rotated as shown in FIG. 6B and descends without being rotated by the curtain stopper 202, such that the glass drum 210 and the curtain drum 220 move downwardly along the linear axis as shown in FIG. 6C. As a result, an operation of the glass 211 is completed as shown in FIG. 6D. As shown in FIGS. 9A and 9B, the curtain drum 220 is fixed, the curtain 211 is fixed, and the glass drum 210 is rotated, such that the glass 211 may ascend or descend.

Meanwhile, in an operating logic according to the exemplary embodiment of the present disclosure, when an up switch is pressed when the glass 211 and the curtain 221 are full-down, only the glass 211 moves upwardly when the curtain 221 is fixed. In this state, when a down switch is pressed, the glass 211 moves downwardly.

In addition, when the up switch is pressed when the glass 211 is full-up and the curtain 221 is full-down, the curtain 221 moves upwardly, and when the down switch is pressed when the glass is full-up and the curtain is full-down, the curtain 221 moves downwardly.

Further, when the down switch is pressed when the glass 211 is full-up and the curtain 221 is full-up, only the curtain 221 moves downwardly in a state in which the glass 211 is fixed.

Further, when the down switch is pressed when the curtain 221 is full-down and the glass 211 is full-up, only the glass 211 moves downwardly in a state in which the curtain 221 is fixed.

As set forth above, according to an exemplary embodiment of the present disclosure, the integrated regulator is used to independently operate the glass and the electric curtain of the door, thereby making it possible to improve user convenience, decrease manufacturing cost, and easily secure a design and an internal space to improve salability.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. An integrated regulator device of a glass and a curtain for a door, comprising:
    a motor provided in a door panel;
    a drive gear inserted into the motor along a linear axis, rotatably provided, and having a shaft;
    a glass drum operated together with the glass provided in the door and inserted into the drive gear to move along the linear axis according to rotation of the drive gear; and
    a curtain drum operated together with an electrically driven curtain provided in the door, inserted into the drive gear, positioned beneath the glass drum, and moving along the linear axis according to the rotation of the drive gear.

2. The integrated regulator device of a glass and a curtain for a door according to claim 1, further comprising:
    a drum retainer disposed over the motor, into which the drive gear including the glass drum and the curtain drum is inserted; and
    a glass stopper and a curtain stopper protruding from a lower surface of an inner side of an upper portion thereof and on an upper surface of an inner side of a lower portion thereof, respectively, to limit rotation of the glass drum and the curtain drum.

3. The integrated regulator device of a glass and a curtain for a door according to claim 1, wherein a center of the drive gear is provided with an insertion protrusion, and centers of the glass drum and the curtain drum are provided with insertion grooves corresponding to the insertion protrusion.

4. The integrated regulator device of a glass and a curtain for a door according to claim 1, wherein a lower portion of the glass drum is provided with ball bearings and an upper portion of the curtain drum is provided with bearing holes corresponding to the ball bearings.

5. The integrated regulator device of a glass and a curtain for a door according to claim 1, wherein an outer peripheral surface of the drive gear and inner peripheral surfaces of the glass drum and the curtain drum inserted into the drive gear are provided with screw threads corresponding to each other.

\* \* \* \* \*